United States Patent [19]

Washio et al.

[11] Patent Number: 5,109,274

[45] Date of Patent: Apr. 28, 1992

[54] COLOR IMAGE PROCESSING APPARATUS

[75] Inventors: Koji Washio; Seiichiro Hiratsuka, both of Tokyo, Japan

[73] Assignee: Konica Corporation, Tokyo, Japan

[21] Appl. No.: 515,127

[22] Filed: Apr. 27, 1990

[30] Foreign Application Priority Data

Apr. 28, 1989 [JP] Japan .................................. 1-109836

[51] Int. Cl.⁵ .............................................. H04N 1/46
[52] U.S. Cl. .......................................... 358/80; 382/17
[58] Field of Search ............................ 358/80; 382/17

[56] References Cited

U.S. PATENT DOCUMENTS

4,841,361  6/1989  Matsunawa et al. ................. 358/80
4,980,760 12/1990  Hiratsuka et al. .................... 358/80

Primary Examiner—Leo H. Boudreau
Assistant Examiner—Steven P. Klocinski
Attorney, Agent, or Firm—Finnegan, Henderson, Farabow, Garrett, and Dunner

[57] ABSTRACT

A color image processing apparatus wherein a color code is generated by a color code generating device in a state where a region to be assigned to chromatic color or achromatic color is changed according to the density gradient of color reading signals, and a document discrimination is executed by counting this color code for each pixel by a document discriminating device. A region to be assigned to achromatic color or chromatic color is changed in accordance with the kinds of images, and simultaneously, a different image processing is carried out according to the kind of an image.

7 Claims, 6 Drawing Sheets

COLOR IMAGE PROCESSING APPARATUS

BACKGROUND OF THE INVENTION

1. Field of the Invention

The present invention relates to a color image processing apparatus, and more particularly, to a color image processing apparatus capable of performing an excellent image discrimination as well as a color reproduction of both character and tonal images.

2. Description of the Prior Art

There is known a color image processing apparatus wherein color images such as character image, photographic image are separated into red R, Green G, and blue B for optical reading, and are recorded on a recording paper by an electrophotographic color output equipment in accordance with recording colors such as yellow Y, magenta M, cyan C, and black K (for color reproduction or color modification) converted from those separated colors.

Figure 8:
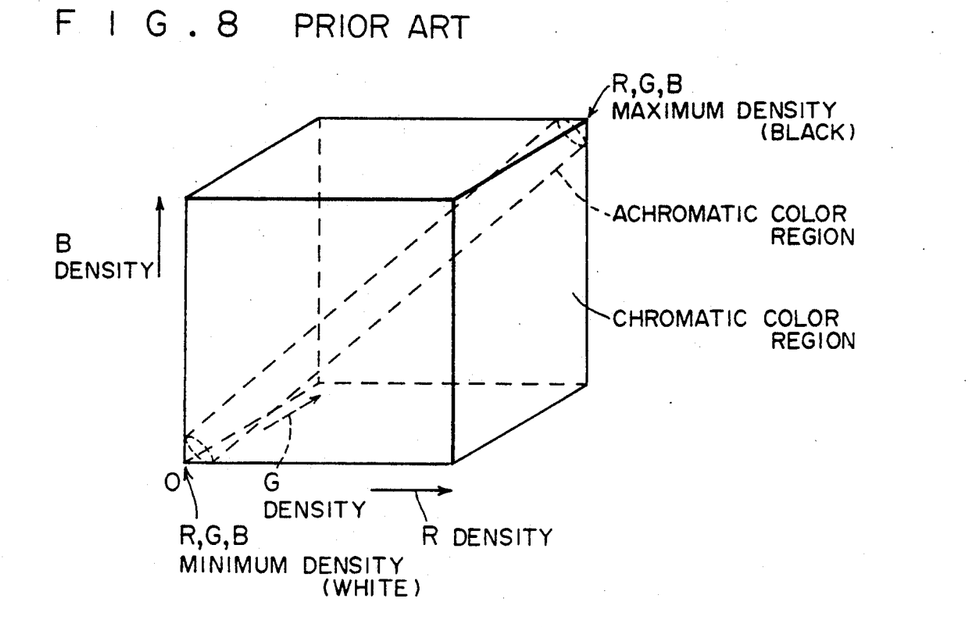
FIG. 8 is a view illustrating the state of conventional color code generation.

FIG. 8 is a view illustrating the state of color discrimination (discrimination of chromatic color or achromatic color) in a color image processing apparatus mentioned above. In a cube shown in FIG. 8, the density of R is represented in the front in the horizontal direction, the density of B, in the vertical direction, and the density of G, in the direction of depth. Therefore, the front left corner at the bottom where all the densities of R, G, and B become zero represents white, and the back right corner at the top where all the densities become greatest represents black. Consequently, the region formed by linking white and black corresponds to an achromatic region (gray), and all others correspond to chromatic ones.

Here, in setting up an achromatic region, there arise contradictory problems subsequently described.

① In order to minimize color ghost appearing in black character image (unnecessary color being generated around the edge of a black character) due to color doubling of each R, G, and B of a CCD sensor or chromatic aberration of a lens, it is desirable to expand the achromatic region as much as possible.

② It is desirable to narrow the achromatic region as much as possible in order to accurately reproduce low-chroma colors (such as brown, dark blue, and purple) in the case of color tonal image.

(Problems to be Solved by the Invention)

Because of the contradictory requirements set forth above, a compromise is made by setting up an achromatic region falling within a range which is acceptable by these two requirements as a practicable means.

Nevertheless, the result is not satisfactory when black character image is reproduced because color ghost is generated particularly around the fine black lines.

The color reproduction of color tonal image having low chroma is not satisfactory, either. In other words, since a given allowance is set up for an achromatic region as mentioned above, a portion with low chroma is reproduced as black.

However, in the case of a color image processing apparatus which processes both color and monochromatic documents, the image output (image formation) is not the same for the color document and the monochromic one. In other words, whereas in the case of the monochromatic document, a black toner image is formed on a photosensitive drum, in the case of the color image, the photosensitive drum is rotated four times to form an image by superposing yellow, magenta, cyan, and black toner images. Therefore, it is required to discriminate the color document from the monochromatic document accurately.

In the conventional color image processing apparatus, chromatic and achromatic pixels are counted respectively in terms of color code, and the color and monochrome discrimination is carried out based on a ratio thus obtained.

However, the discrimination such as above rises problems subsequently described.

① In the case of a document having many fine black lines (monochrome) in which color ghost appears, such document is mistaken for a color document when they are discriminated due to the effect produced by the color ghost.

② In the case of a document having smaller portions of high chroma and larger portions of low chroma (color), such document is mistaken for a monochromic one when they are discriminated because the reproduction of the low chroma portion results in black.

Also, in the case of color tonal image and black character image, although it is desirable to adjust the gradation($\gamma$) or the amount of MTF correction, these images cannot be reproduced satisfactorily because the gradation and amount are fixed in practice.

SUMMARY OF THE INVENTION

The present invention is made in consideration of the above-mentioned problems, and the purpose thereof is to obtain a color image processing apparatus whereby the discrimination of color and monochromatic documents can be carried out accurately.

A color image processing apparatus according to the present invention can solve the above-mentioned problems, in which a color or monochromatic document is discriminated by counting the color code of each pixel respectively in chromatic and achromatic colors in the document, a color code is generated by changing a color region to be assigned to chromatic color or achromatic color in accordance with the density gradient of color reading signal, and the document discrimination is carried out by counting this color code.

Another purpose of the present invention is to provide a color image processing apparatus whereby the color reproductivity of low chroma in color tonal image are improved, and resolution of character image is increased to reduce color ghost.

The present invention that solves the above-mentioned problems is characterized by a color image processing apparatus in which an image processing is executed by separating color reading signals into achromatic and chromatic colors, a means for discriminating and processing the kinds of images according to color reading signals is provided so that a region to be assigned to achromatic color or chromatic color is changed in accordance with the result of discrimination executed by this means for image discrimination processing, and simultaneously, different tonal processing or different spatial frequency filter processing are carried out in accordance with the result of discrimination executed by said means for image discrimination processing.

In a color image processing apparatus according to the present invention, a color code is generated in a state where a region to be assigned to chromatic color or achromatic color is changed according to the density gradient of color reading signals, and a document discrimination is executed by counting this color code for each pixel. Also, a region to be assigned to achromatic color or chromatic color is changed in accordance with the kinds of images, and simultaneously, a different image processing is carried out according to the kind of an image.

Another purpose of the present invention and characteristics will readily be understood from the subsequent description with reference to the drawings.

DESCRIPTION OF THE PREFERRED EMBODIMENTS

Figure 1:
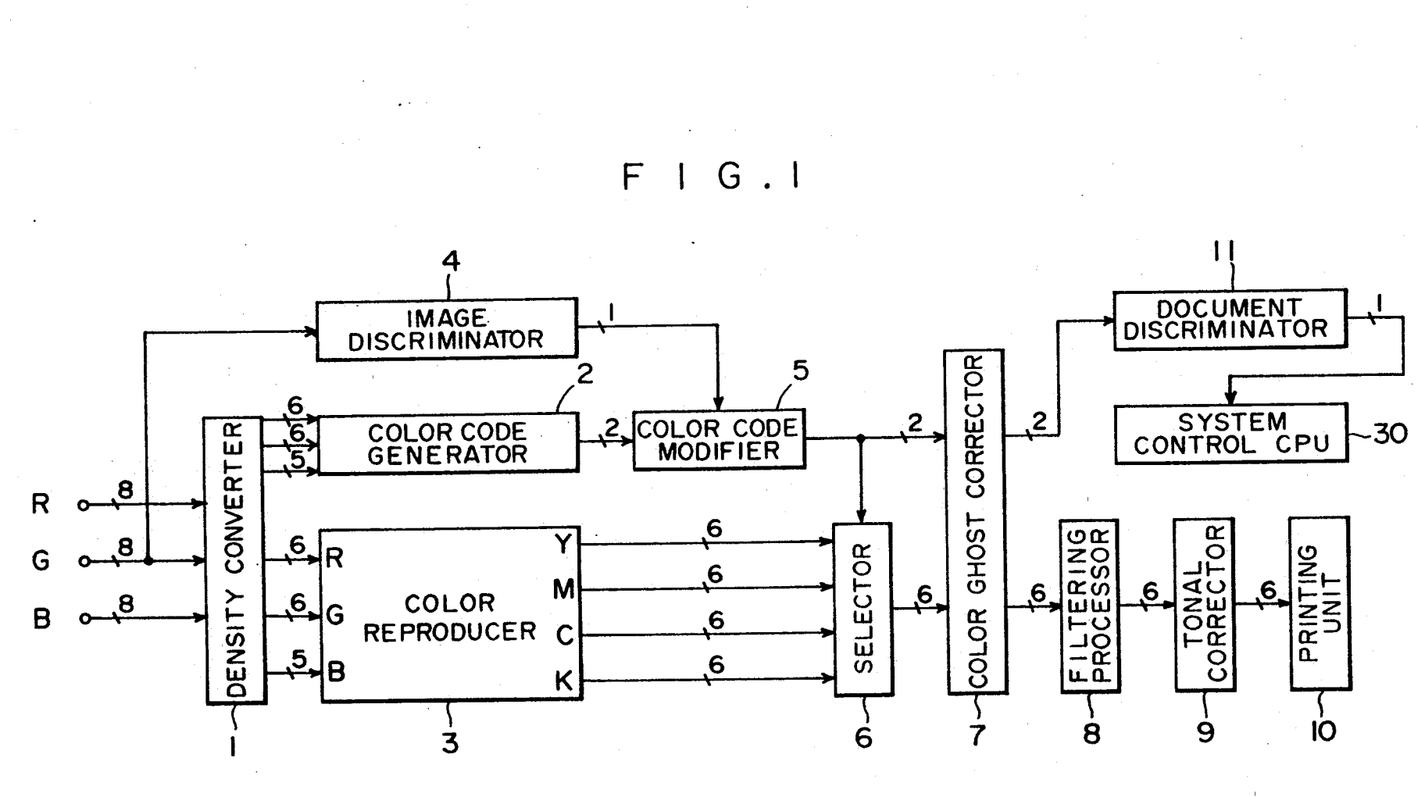
FIG. 1 is a schematic diagram representing an embodiment according to the present invention.

FIG. 1 is a schematic diagram representing the structure of an embodiment according to the present invention. In FIG. 1, 1 is a density converter for converting each 8-bit digital data for R, G, and B given from outside to each 6-, 6-, and 5-bit data respectively. 2 is a color code generator for outputting color codes after the discrimination of white, black, chromatic colors and intermediate colors in accordance with the data R, G, and B received from the density converter 1. 3 is a color reproducer for carrying out a color reproduction to generate Y, M, C, and K data on receiving the R, G, and B data. 4 is an image discriminator for discriminating black character image from color tonal image based on density gradients of received 8-bit G data. 5 is a color code modifier for assigning the color codes of intermediate colors received from the image discriminator 4 to chromatic color code or achromatic color code. 6 is a selector for selectively passing Y, M, C, and K density data received from the color reproducer 3 in accordance with the modified color code. 7 is a color ghost corrector for correcting color ghost. 8 is a filter processor for carrying out various filter processings. 9 is a tonal corrector for correcting tonal characteristics. 10 is a printing unit for forming image by Y, M, C, and K density data. 11 is a document discriminator for finally discriminating color document from monochromatic document by the ratio between the black and chromatic color of the color codes (white/black/chromatic colors) obtained after color ghost correction. 30 is a system control CPU for controlling each unit of the entire system. In this respect, the system is structured in such a manner that the document discrimination is carried out during the prescanning, and that the system control CPU 30 controls the image recording mode during the image recording in accordance with the result of the document discrimination.

The operation of this embodiment will subsequently be described.

A document image is read by an image reader, not shown, and is converted into 8-bit digital data for each R, G, and B. Then, the respective digital data for R, G, and B are supplied to the density converter 1. In the density converter 1, the 8-bit data are converted into the 6-, 6-, and 5-bit data respectively to match the person's visual characteristics. Then, the output data of R, G, and B from the density converter 1 are applied to the color code generator 2 and the color reproducer 3. In the color code generator 2, color codes are generated to indicate, in accordance with the level of the respective R, G, and B data, to which of white, black, achromatic color and intermediate color each pixel belongs as described later.

Figure 2:
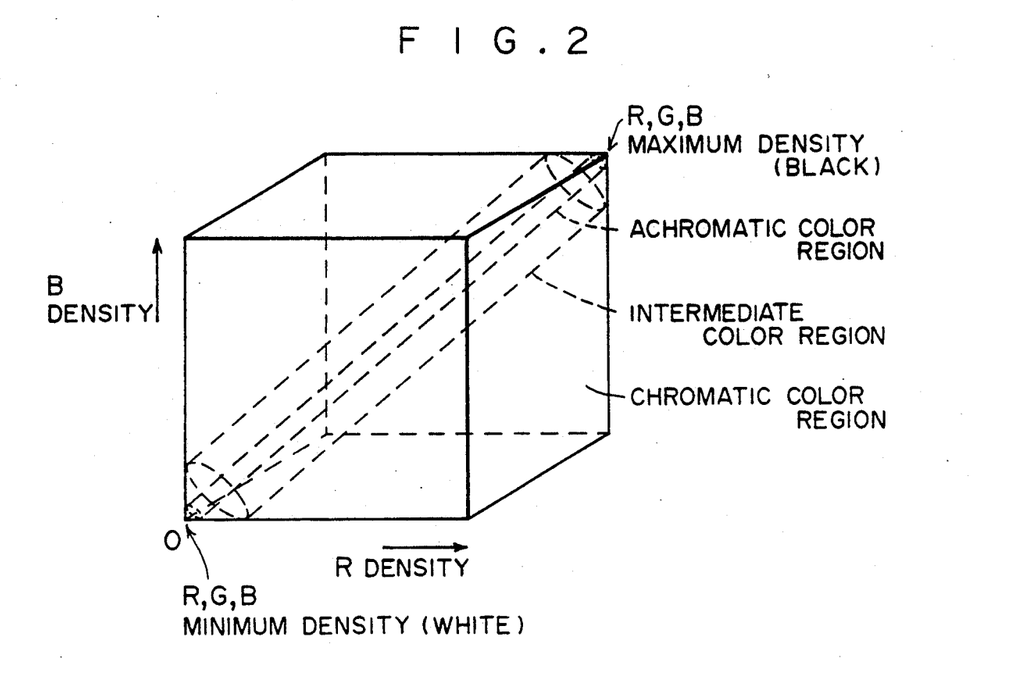
FIG. 2 is a view illustrating the state of color code generation.
Figure 5A:
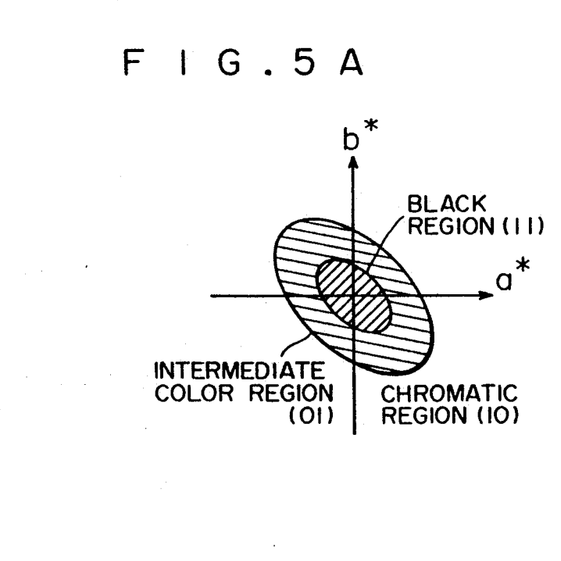
FIGS. 5A, 5B, 5C are views illustrating the states of color separation.

FIG. 2 is a view illustrating the state of color code generation in the color code generator 2. In a cube shown in the FIG. 2, the front horizontal directional arrow represents the density of R. Then, the vertical direction represents the density of B, and the depth direction, the density of G. Therefore, the front lower left corner and its vicinity are where all the densities of R, G, and B become zero and represent white (color code; 00), and the back upper right corner and its vicinity are where all the densities become greatest and represent black. Here, while a narrow achromatic region (color code; 11) linking white and black (hereinafter referred to as black because the achromatic color is recorded with black toner) is set up, a comparatively wide region of intermediate colors (color code; 01) is set up. Then, any other region is set up as a region of chromatic colors (color code; 10). In other words, in either case of the black character image or the color tonal image, only the achromatic (black) region is set up as the black region. Then, a low-chroma region in the case of color tonal image and a region likely to develop color ghost in the case of black character image are set up as the region of intermediate colors. This state is represented in FIG. 5A by the CIE L*a*b* uniform color space.

Therefore, the color code generator 2 outputs the above-mentioned 2-bit color codes (white; 00, black; 11, intermediate color; 01, and chromatic color; 10).

This color code is supplied to the color code modifier 5. Then, the color code modifier 5 modifies the color code for intermediate color (01) to either black (11) or chromatic color (10) based on the image discrimination signal (a signal for discriminating a color tonal image from a black character image) generated by the image discriminator 4. In other words, if an image in process is a color tonal image, the color code for intermediate color is modified to the one for chromatic color (FIG. 5C) in order to improve the reproductivity of color having low chroma. Also, if an image in process is a black character image, the color code for intermediate color is modified to the one for black (FIG. 5B) in order to suppress the generation of color ghost.

Figure 3:
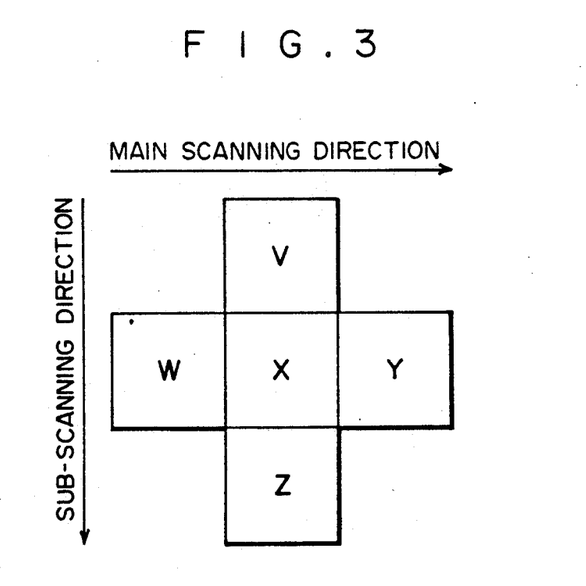
FIG. 3 is a diagram illustrating the state of image discrimination.

FIG. 3 is a diagram illustrating the state of image discrimination. In FIG. 3, X is an objective pixel requiring an image discrimination; V is a pixel located one line ahead; W is a pixel, one pixel portion ahead; Y is a pixel, one pixel portion behind; and Z is a pixel, one line behind. Here, a density gradient is obtained by utilizing the density data (8 bits) of each pixel. In other words, the density gradient S of the objective pixel X can be obtained from following expression:

$$S = |V-X| + |W-Y| \quad (1)$$

Thus, the S parameter of the density gradient of the surrounding pixels are obtained.

In this respect, parameters other than this S parameter can be obtained as follows:

$$S' = |V-X| + |W-X| \quad (2)$$

$$S'' = |V-Z| + |W-Y| \quad (3)$$

However, S' is not capable enough to carry out any satisfactory discrimination because this parameter uses only two surrounding pixels, while S'' has an disadvantage that it needs a large number of image memories because it requires three pixels in the direction of sub-scanning. Therefore, the S parameter of the (1) expression is applied because it is capable of carrying out a highly efficient discrimination despite its small capacity.

Figure 4:
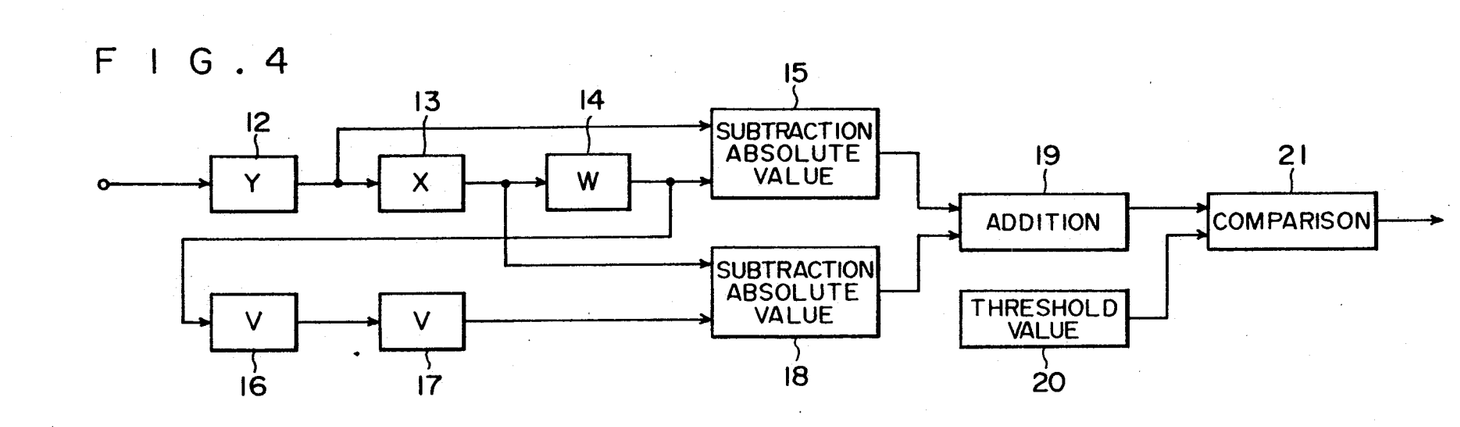
FIG. 4 is a schematic diagram showing an example of the configuration of image discriminator.

FIG. 4 is a schematic diagram showing an example of the structure of image discriminator 4. In FIG. 4, 12 is a register for holding the data of pixel Y. 13 is a register for holding the data of pixel X, and 14 is a register for holding the data of pixel W. 15 is a circuit for generating an absolute value ($|W-Y|$) after subtraction between W and Y. 16 and 17 are registers for holding the data of pixel V. 18 is a circuit for generating an absolute value ($|V-X|$) after subtraction between V and X. 19 is an adder for adding the outputs of the substraction/absolute value circuits 15 and 18 ($|W-Y| + |V-X|$). 20 is a threshold value generator for generating the threshold value of the density gradient. 21 is a comparator for generating image discrimination signal by comparing the output of the added value of the adder 19 with the threshold value.

Next, this image discrimination will be described from the viewpoint of coloring aspect. In a chromaticity plane a*b* in the CIE L*a*b* uniform color space, each color code for black, intermediate color, and chromatic color is set in each color region shown in FIG. 5A.

In this respect, the region of this color code is obtained by the reading level (8 bits; 0~255) of R, G, and B and Q of an expression below.

$$Q = \frac{\sqrt{0.75(R-W_2)^2 + 1.5(G-W_2)^2 + 0.75(B-W_2)^2}}{\sqrt{W_2 \times W_0}}$$

Here, $W_2 = (R + 2G + B)/5$, $W_0 = 255$ (1) When $Q \leq 15$ and $G > 180$, color code: 00 (white)
(2) When $Q \leq 7.5$ and $G \leq 180$, color code: 11 (black)
(3) When $7.5 \leq Q \leq 15$ and $G \leq 180$, color code: 01 (intermediate color)
(4) When $Q > 15$, color code: 10 (chromatic color)

Figure 5B:
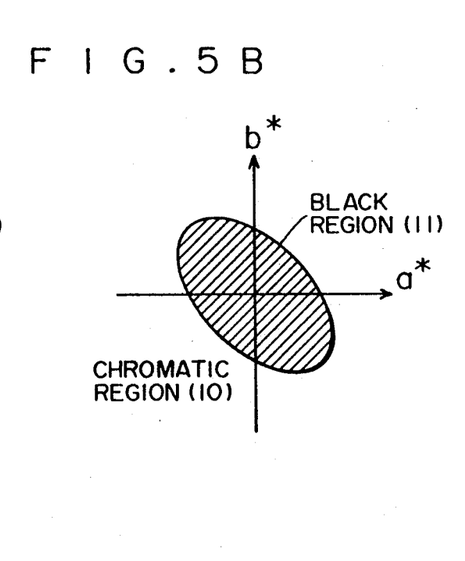
Figure 5C:
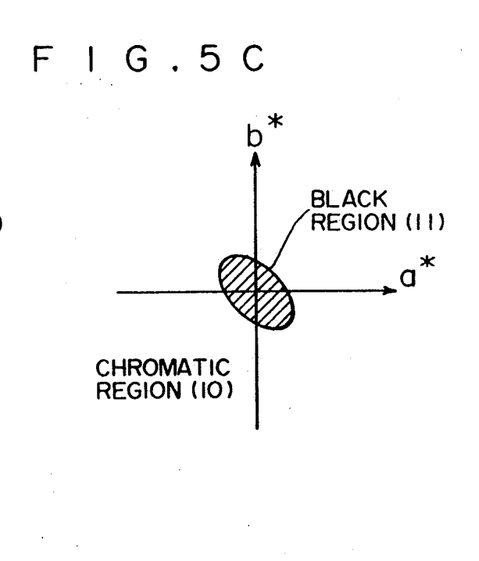

Then, the image discriminator 4 obtains the parameter S, and compares this S with the threshold value T. When $S > T$, it recognizes the object as a black character image and converts the region of intermediate color into the region of black (FIG. 5B). Also, when $S \leq T$, it recognizes the object as a color tonal image, and converts the region of intermediate color into the region of chromatic color (FIG. 5C).

Figure 6:
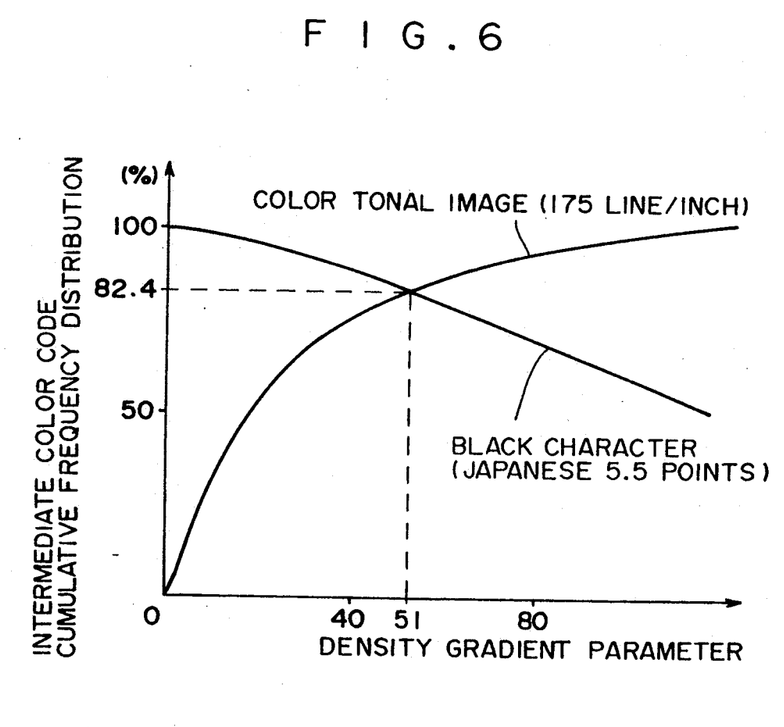
FIG. 6 is a diagram showing the characteristic relationship between the density gradient and image discrimination.

FIG. 6 is a diagram showing a cumulative frequency distribution obtained from a histogram of the density gradient parameter S for intermediate color. In FIG. 6, the color tonal image shows the ratio of the chromatic code, and the black character image shows the ratio of black code. The point at which these cross each other represents the same discrimination ratio. In this case, with the threshold value T=51, the discrimination ratio becomes 82.4%. Therefore, the discrimination of color tonal image from black character image is carried out with the threshold value T set at 51.

After the color code has been modified, the Y, M, C, and K data pass through the selector 6 selectively based on the modified color code and scan code (a code indicating colors in which recording is made on a printer). In other words, if the modified color code is chromatic (10), the Y, M, and C from the color reproducer 3 pass through the selector 6. Also, if the modified color code is black, the K from the color reproducer 3 passes through the selector 6.

Then, the color code for which color ghost is corrected is supplied to the document discriminator 11. The document discriminator 11 discriminates the monochromatic document from color document by counting the numbers of pixels of the black color code and chromatic color code respectively. In other words, if more black pixels are found in the document, the document discriminator determines it as a monochromatic document while if more chromatic color pixels are found, it is handled as a color document. The color code counted here is the one for which any color ghost has been corrected because assigning intermediate colors to black or chromatic color has been completed, and there is no possibility that a monochromatic document is wrongly discriminated as a color document. Also, since any existing chromatic color having low chroma is modified to the color code for chromatic color, there is no chance that a color document is wrongly discriminated as a monochromatic document.

Then, the result of this judgment is supplied to the system control CPU 30 as monochromic/color discrimination signal (1 bit), and the selection of monochromic signal color mode and full color mode is performed automatically. During the scanning for reading an image after prescanning, each scanner, image processer, or printer is controlled according to the mode, and the image formation is carried out in accordance with the kind of document.

As set forth above, according to this embodiment, a color code is classified as chromatic color, black, white and intermediate color, and then, in accordance with the result of image discrimination, the intermediate color is assigned to either black or chromatic color. Therefore, the color codes for black and chromatic color can be generated accurately. Then, in turn, the kinds of images are discriminated by counting the number of pixels in each color code for the document. As a result, the image discrimination can be carried out accurately.

Figure 7:
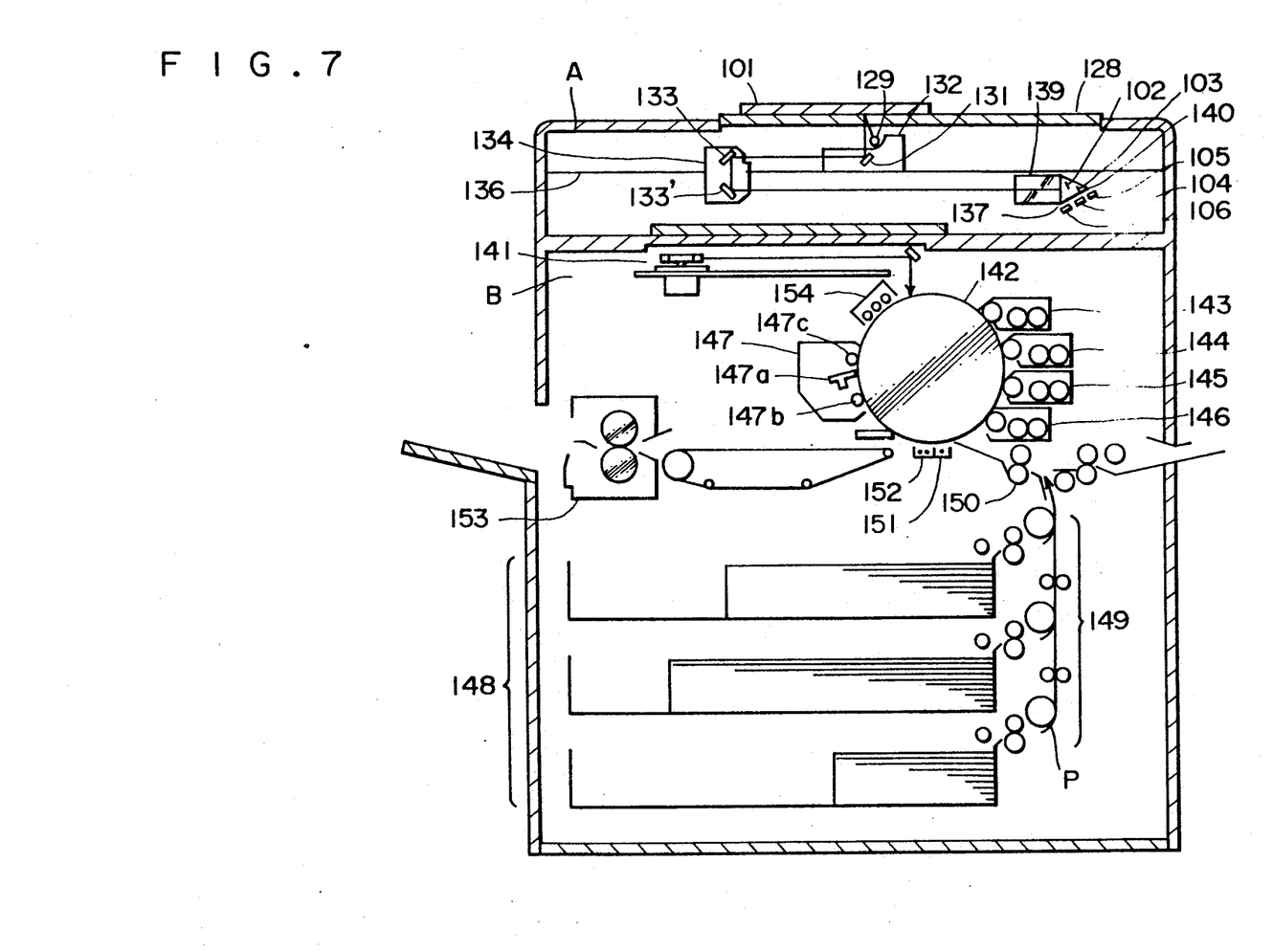
FIG. 7 is a schematic view showing the entire structure of a color copying machine.

With reference to FIG. 7, the structure of each component and the operation of a color copying machine to which a color image processing apparatus according to the present invention is applied will be described. This color copying machine uses a color dry developing system for its development operation. In this example, a two-component non-contact development system, as well as a reversal development, is employed for the development processing in this color copying machine. In other words, a transfer drum employed for the conventional color image formation is not used. This machine performs superposition on an electrophotographic sensitive drum for forming an image. Also, for an example subsequently described, a development is carried out on an OPC photosensitive body (drum) for the formation of an image by rotating the drum four times in order to develop a four-color image of yellow, magenta, cyan, and black. Then, it is copied on a normal recording paper or others in one transfer operation after the development.

When a copying button on the apparatus for the color copying machine is depressed, a document reading section A is actuated. Then, the document 101 set on a document glass plate 128 is optically scanned by an optical system.

This optical system comprises a light source 129 such as halogen lamps and others, a carriage 132 with a reflecting mirror 131, and a movable mirror unit 134 with V mirrors 133 and 133'.

The carriage 132 and the movable unit 134 are moved along a slide rail 136 by a stepping motor respectively at a given speed and in a given direction.

Optical information (image information) obtained by irradiating the document 101 with the light source 129 is led into an optical information conversion unit 137 through the reflecting mirror 131 and mirrors 133 and 133'.

A standard white board is mounted on the left end portion of the reverse side of the document glass plate 128. The purpose thereof is to normalize an image signal to a white signal by scanning the standard white board optically.

The optical information conversion unit 137 comprises a lens 139, a prism 140, two dichroic mirrors 102 and 103, CCD 104 for imaging red separation image, CCD 105 for imaging green separation image, and CCD 106 for imaging blue separation image.

The optical signals obtained by the optical system are converged by the lens 139 and are separated by the dichroic mirror 102 equipped in the above-mentioned prism 140 into blue optical information and yellow optical information. Then, yellow optical information is further separated by the dichroic mirror 103 into red optical information and green optical information. In this way, the color optical image is separated by the prism 140 into the three-color optical information of red R, Green G, and Blue B.

The respective color separation image is formed on the receiving surface of each CCD. Thus, an image signal converted to an electric signal is obtained. Each color signal of the image signal is outputted to the writing section B after being processed by the signal processing system.

The signal processing system includes an A/D converter and others in addition to various signal processing circuits shown in FIG. 1 such as the density converter 1 and the document discriminator 11.

The writing section B has a deflecting system 141. For this deflecting system 141, galvanomirror or rotary polygon mirror and others or a deflecting system having an optical deflector using crystal and other can be employed. The laser beam modulated by color signal is deflection-scanned by this deflecting system 141.

When the deflective scanning is started, the beam scanning is detected by a laser beam index sensor (not shown), and a beam modulation is started by a first color signal (for example, yellow signal). The modulated beam is caused to scan the image retainer (photosensitive drum) 142 which is evenly electrified by an electric charger 154.

Here, an electrostatic latent image is formed for the first color signal on the image retainer 142 by the main scanning of the laser beam and the sub-scanning by the rotation of the image retainer 142.

This electrostatic latent image is developed by a developing device 143 containing yellow toner for the formation of a yellow toner image. In this respect, a given developing bias voltage is applied to this developing device from a high-voltage supply source.

The toner supply to the developing device 143 is carried out as required by a toner supply means (not shown) controlled in accordance with an instruction signal from the system control CPU (not shown). The above-mentioned yellow toner image is rotated under such condition that the press contact of a cleaning blade 147a is released, and as in the case of the first color signal, an electrostatic latent image is formed by a second color signal (for example, a magenta signal). Then, using a developing device 144 which contains magenta toner, this latent image is developed for the formation of a magenta toner image.

It is needless to mention that a given developing bias voltage is applied to the developing device 144 from a high-voltage supply source.

Likewise, an electrostatic latent image is formed by a third color signal (cyan signal), and a cyan toner image is formed by a developing device 145 containing cyan toner. Also, an electrostatic latent image is formed by a fourth color signal (black signal), and is developed by a developing device 146 containing black toner in the same way as previously described.

Therefore, a multi-color toner image is formed on the image retainer 142 by superposing one image on another.

Here, in this respect, although the formation of a multi-toner color image with four different colors is described, it is needless to mention that a two-color or single-color toner image can also be formed.

As a developing process, the so-called two-component non-contact development is described for example. This processing carries out a development by flying each toner toward the image retainer 142 for the development under a condition that ac or dc bias voltage is applied from a high-voltage supply source as described above.

Also, the toner supply to the developing devices 144, 145, and 146 is carried out in such a manner that a given amount of toner is supplied in accordance with an instruction signal from the CPU in the same way as described above.

Meanwhile, the recording paper P is fed from a paper feeder 148 through a feeding roller 149 and a timing roller 150, and is transferred onto the surface of the image retainer 142 timed to the rotation of the image retainer 142. Then, a multi-color toner image is transferred onto the recording paper P by a transfer electrode 151 to which a high voltage is applied from the high-voltage supply source, and is separated by a separation electrode 152.

The separated recording paper P is transferred to a fixing device 153 in which a fixing process is carried out for the formation of an color image.

When the copying is completed, the image retainer 142 is cleaned by a cleaner 147 for the preparation of the next image formation processing.

In the cleaner 147, a given direct current voltage is applied to a metallic roller 147b in order to facilitate the collection of toner removed by the cleaning blade 147a. This metallic roller 147b is arranged above the surface of the image retainer 142 in such a manner that the roller is not in contact with the surface thereof. The pressure given to the cleaning blade 147a is released when a cleaning is completed, but in order to remove unnecessary toner remaining at the time of releasing, an auxiliary roller 147c is provided. In order to clean and remove unnecessary toner completely, this auxiliary roller 147c is placed in contact with the image retainer 142 under a pressure while it is rotated in the reverse direction to that of the image retainer.

In the above-mentioned embodiment, the color image processing apparatus according to the present invention is applied to the color copying machine. It is readily understandable that the color image processing apparatus according to the present invention can be applied to various kinds of equipment other than the one set forth as above.

In another embodiment according to the present invention, MTF correction, smoothing process and others are carried out in the filtering processing after the ghost correction is made.

The MTF correction is a process to correct a lowered resolution caused by various reasons. Therefore, it is desirable to adjust the amount of correction for MTF in character mode and photographic mode. For example, in the character mode, the amount of correction must be increased while in the photographic mode, it must be decreased. To make such adjustment, a filter coefficient should be changed according to a mode by employing a convolution filter using image data having pixel of N×N (N=3, 5, and 7). In other words, the convolution filter is used as a high-pass filter for a character image and is low-pass filter for a color tonal image.

Also, when a tonal image is processed, a smoothing process is carried out in order to reduce the beat disturbance (moiré) caused between dots.

As an example of this filter coefficient, there exists, for example, the following:

① high-pass filter;

$$1/2 \begin{bmatrix} 0 & -1 & 0 \\ -1 & 6 & -1 \\ 0 & -1 & 0 \end{bmatrix}$$

② low-pass filter;

$$1/5 \begin{bmatrix} 0 & 1 & 0 \\ 1 & 1 & 1 \\ 0 & 1 & 0 \end{bmatrix}$$

Figure 9:
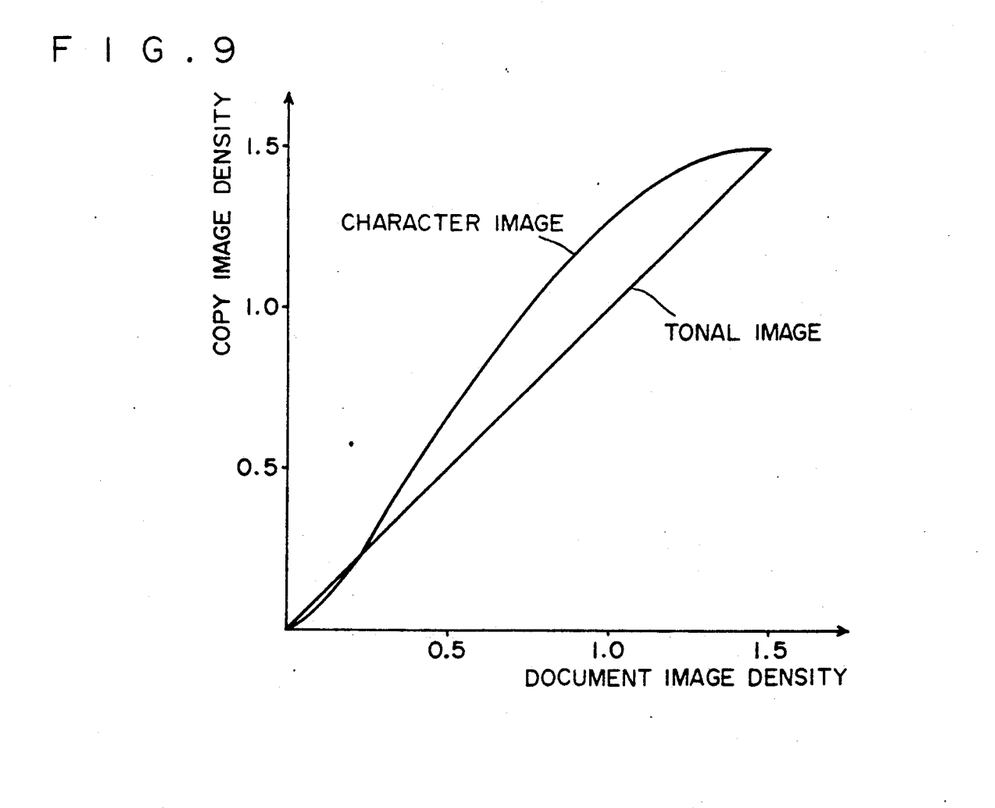
FIG. 9 is a diagram showing the γ characteristics of character and tonal images.

In the toner corrector 9, when a tonal image is processed as shown in FIG. 9, the gradation (γ) is lowered to obtain a smooth tonal characteristic. Also, when a character image is processed, γ is set higher than normal in order to obtain a sharper image.

Then, when an image processing is completed, the image signal is supplied to the peripheral printing unit and others for the image formation on a recording paper.

As set forth above, according to this embodiment, the color code is classified as chromatic color, black, white and intermediate color, and then, while the intermediate color is assigned to black or chromatic color in accordance with the processing mode, the content of the image processing (MTF correction and γ correction) is changed according to a mode. As a result, in the black character image, the region of intermediate color becomes the black region so that any generation of color ghost can be prevented and that a sharp image can be obtained because resolution is improved. Also, in the color tonal image, the region of intermediate color becomes the region of chromatic color so that a chromatic color having low chroma can be reproduced in a good condition and that an image with an excellent tonal reproductivity can be obtained.

As set forth above in detail, according to the present invention, the region of intermediate color is set up when chromatic color and achromatic color are separated, and this region of intermediate color is assigned to the chromatic color or the achromatic color in accordance with the kind of an image. Then, in turn, by counting the number of pixels in each color code in a document, the kinds of images are discriminated. As a result, the discrimination of the document is carried out with a color code accurately modified so as to obtain a color image processing apparatus capable of discriminating color document from monochromatic document accurately.

Also, the content of image processing can be changed in accordance with the kind of an image. Therefore, it is possible to provide a color image processing apparatus capable of improving the color reproduction of a tonal image having a low chroma to obtain a better tonal characteristic, and at the same time, improving the resolution of a character image to reduce color ghost.

What is claimed is:

1. A color image processing apparatus characterized by comprising;

color document reading means for reading a document and generating a first color image signal for each pixel, color code generating means for processing said first color image signal and generating a second color image signal having a code corresponding to a color of each pixel of said document, image discriminating means for discriminating the kind of image on said document, color code modifying means for modifying said second color image signal on the basis of a result of said image discriminating means, and document discriminating means for discriminating whether said document is a monochromatic document or a color document by counting the color code modified by said color code modifying means.

2. The color image processing apparatus according to claim 1, further comprising color ghost correcting means, wherein the document is discriminated by counting the color code corrected by said color ghost correcting means.

3. The color image processing apparatus according to claim 1, wherein said first color image signal has a density gradient and wherein said image discriminating means discriminates the image according to said density gradient.

4. A color image processing apparatus comprising;
color document reading means for reading a document and generating a first color image signal for each pixel,
color code generating means for processing said first color image signal and generating a second color image signal having a code corresponding to a color of each pixel of said document,
image discriminating means for discriminating the kind of image on said document,
color code modifying means for modifying said second color image signal on the basis of a result of said image discriminating means, and
document discriminating means for discriminating whether said document is a monochromatic document or a color document by counting the color code modified by said color code modifying means, said color code having a chromatic color code, achromatic color code and intermediate color code, and said color code modifying means modifying the intermediate color code to change to the chromatic color code or the achromatic color code.

5. The color image processing apparatus according to claim 4, wherein said first-color image signal has a density gradient and wherein said image discriminating means discriminates the image according to said density gradient.

6. A color image processing apparatus comprising;
color document reading means for reading a document and generating a first color image signal for each pixel,
color code generating means for processing said first color image signal and generating a second color image signal having a code corresponding to a color of each pixel of said document,
image discriminating means for discriminating the king of image on said document,
color code modifying means for modifying said second color image signal on the basis of a result of said image discriminating means,
document discriminating means for discriminating whether said document is a monochromatic document or a color document by counting the color code modified by said color code modifying means, and
color ghost correcting means, wherein the document is discriminated by counting the color code corrected by said color ghost correcting means, said color code having a chromatic color code, achromatic color code and intermediate color code, and said color ghost correcting means changing said intermediate color code to the chromatic color code or achromatic color code.

7. The color image processing apparatus according to claim 6, wherein said first color image signal has a density gradient and wherein said image discriminating means discriminates the image according to said density gradient.

* * * * *